(12) United States Patent
Ali et al.

(10) Patent No.: US 8,358,615 B2
(45) Date of Patent: Jan. 22, 2013

(54) MODULATION AND CODING SCHEME SELECTION METHOD FOR A SPECIFIC ABSORPTION RATE COMPLIANT COMMUNICATION DEVICE

(75) Inventors: Shirook Ali, Waterloo (CA); James Womack, Irving, TX (US); Amin Mobasher, Waterloo (CA); James Warden, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 300 days.

(21) Appl. No.: 12/722,362

(22) Filed: Mar. 11, 2010

(65) Prior Publication Data

US 2011/0222469 A1 Sep. 15, 2011

(51) Int. Cl.
*H04W 4/00* (2009.01)
(52) U.S. Cl. ...... 370/328; 370/252; 370/335; 455/127.1
(58) Field of Classification Search .................. None
See application file for complete search history.

(56) References Cited

U.S. PATENT DOCUMENTS

| | | | |
|---|---|---|---|
| 6,388,997 B1 | 5/2002 | Scott | |
| 6,708,041 B1 | 3/2004 | Butovitsch et al. | |
| 2002/0167930 A1 | 11/2002 | Pearl | |
| 2003/0064761 A1 | 4/2003 | Nevermann | |
| 2003/0228891 A1 | 12/2003 | Kobayashi et al. | |
| 2003/0232630 A1 | 12/2003 | Wilhelm | |
| 2005/0113103 A1* | 5/2005 | Snowden et al. | 455/451 |
| 2006/0182067 A1* | 8/2006 | Rinne et al. | 370/335 |
| 2008/0085736 A1 | 4/2008 | Kitamura et al. | |
| 2009/0028261 A1 | 1/2009 | Zhang et al. | |
| 2009/0213955 A1* | 8/2009 | Higuchi et al. | 375/267 |
| 2011/0034135 A1* | 2/2011 | Ali et al. | 455/103 |

FOREIGN PATENT DOCUMENTS

| | | |
|---|---|---|
| EP | 0843421 A2 | 5/1998 |
| EP | 1229664 A1 | 8/2002 |
| EP | 1298809 A2 | 4/2003 |
| EP | 1533915 A1 | 5/2005 |

(Continued)

OTHER PUBLICATIONS

Ali, Shirook, et al.; U.S. Appl. No. 12/536,339; Title: Transmission Control for a Specific Absorption Rate Complaint Communication Device; filed Aug. 5, 2009.

(Continued)

*Primary Examiner* — Chi Pham
*Assistant Examiner* — Mohammad Adhami
(74) *Attorney, Agent, or Firm* — Conley Rose, P.C.; J. Robert Brown, Jr.

(57) ABSTRACT

Transmission of data from a portable communication device to a base station via a radio frequency signal uses a plurality of modulation and coding schemes and a protocol that has recurring frames. Each frame has a plurality of transmission slots, different numbers of which can be used to transmit data. When it is desired to transmit data a higher rate than was used previously, an attempt is made to increase the number transmission slots being used. If doing so, produces a transmission results in a specific absorption rate limit being exceeded, then the modulation and coding scheme is changed to one having a greater data coding rate. The power level and the number transmission slots then are set so that the data transmission does not exceed the specific absorption rate limit. The data is then transmitted by the portable communication device.

10 Claims, 7 Drawing Sheets

FOREIGN PATENT DOCUMENTS

WO             03013020 A1     2/2003

OTHER PUBLICATIONS

Extended European Search Report; EP Application No. 10172095.1; Apr. 28, 2011; 10 pages.

PCT International Search Report; Application No. PCT/US11/27482; Jun. 9, 2011; 2 pages.

PCT Written Opinion of the International Searching Authority; Application No. PCT/US11/27482; Jun. 9, 2011; 8 pages.

Partial European Search Report; EP Application No. 10172095.1; Feb. 2, 2011; 5 pages.

European Examination Report; EP Application No. 10172095.1; Aug. 13, 2012; 5 pages.

\* cited by examiner

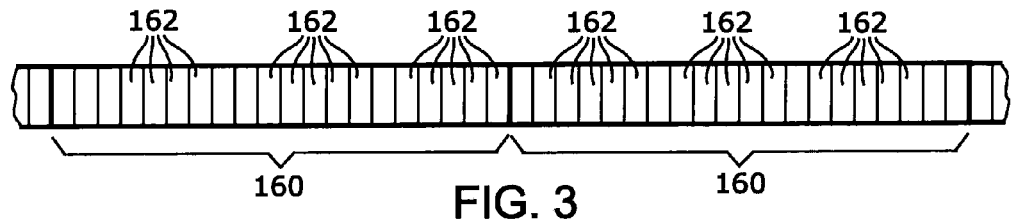
FIG. 3
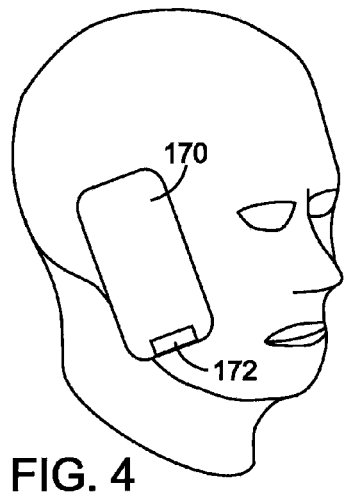
FIG. 4
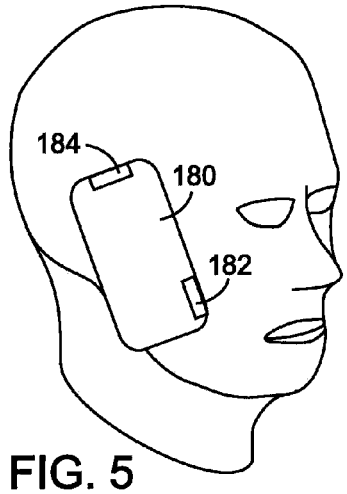
FIG. 5
MODULATION AND CODING SCHEMES
| RANK | MODULATION TYPE | CODING RATE (x 1024 BPS) |
|---|---|---|
| 0 | 0 | 0 |
| 1 | QPSK | 78 |
| 2 | QPSK | 120 |
| 3 | QPSK | 193 |
| 4 | QPSK | 308 |
| 5 | QPSK | 449 |
| 6 | QPSK | 602 |
| 7 | 16QAM | 378 |
| 8 | 16QAM | 490 |
| 9 | 16QAM | 616 |
| 10 | 64QAM | 466 |
| 11 | 64QAM | 567 |
| 12 | 64QAM | 666 |
| 13 | 64QAM | 772 |
| 14 | 64QAM | 873 |
| 15 | 64QAM | 948 |
FIG. 9

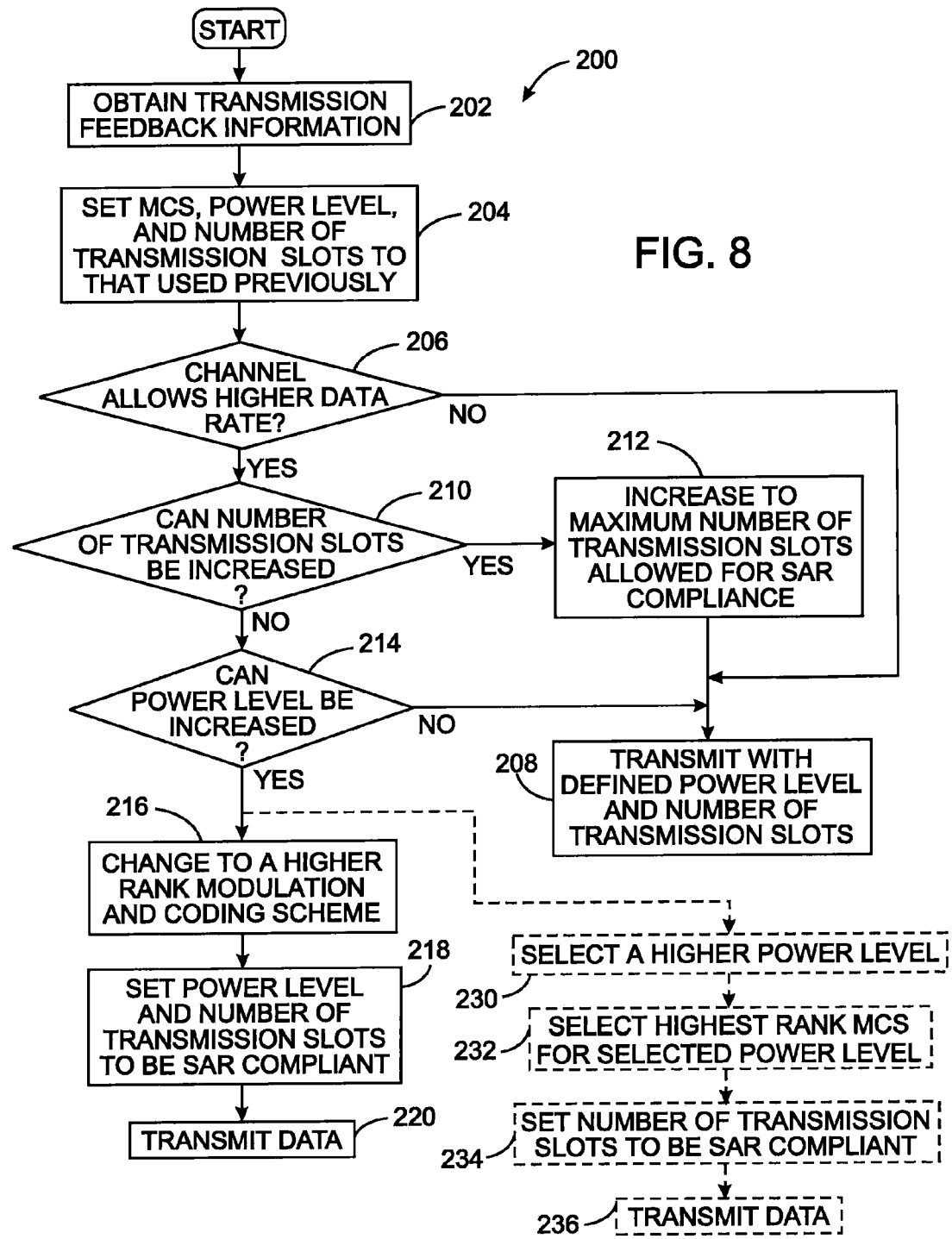

MODULATION AND CODING SCHEME SELECTION METHOD FOR A SPECIFIC ABSORPTION RATE COMPLIANT COMMUNICATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE DISCLOSURE

The present disclosure relates to portable communication devices, examples of which include mobile, or handheld, devices such as pagers, cellular phones, cellular smartphones, wireless organizers, personal digital assistants, wirelessly enabled notebook computers, and the like; and more particularly to controlling the intensity of the wireless signals transmitted by such portable communication devices and the rate at which data are transmitted.

A wide variety of different types of portable wireless communication devices are on the market for communicating voice, data, images, and other forms of information. When being used, some of these devices are held against the ear of the user and some of the emitted radio frequency energy is absorbed by the user's body. A measurement of absorption of energy at a particular radio frequency is specified as a Specific Absorption Rate (SAR). As will be appreciated, the SAR value depends heavily upon the location of the transmitting antennas with respect to the body and the amount and the duration of the transmitted power. With a cell phone, for example, that is held against a person's ear, a greater intensity of radio frequency energy can be emitted by an antenna located near the bottom of the device positioned adjacent the jaw of the user as compared to when an antenna is located at the top of the device immediately adjacent to the ear.

Government agencies, such as the Federal Communication Commission (FCC) in the United States of America, have adopted limits for safe exposure to radio frequency (RF) energy. For example, the FCC limit for exposure from cellular telephones is a SAR level of 1.6 watts per kilogram (1.6 W/kg), which is referred to as a specific absorption rate limit.

Voice and data transmissions may employ a communication protocol in which the transmissions occur in a one millisecond transmission slot contained within a 20 millisecond frame, i.e., a given communication device transmits once every 20 milliseconds. When transmitting data, it is desirable to utilize as many of transmission slots in each frame as possible in order to send the data quickly. However, the more of the frame that is used, the greater the RF energy that is emitted and thus the specified SAR limit may be exceeded by the data transmission.

The transmissions may use different modulation and coding schemes (MCS). Such schemes commonly used by portable communication devices include quadrature phase-shift keying (QPSK) and quadrature amplitude modulation (QAM), each having several different coding rates at which the data are transmitted during each transmission slot. The data throughput, i.e., the average rate of successful message delivery over the communication channel, can be increased by changing the MCS to one that provides a higher coding rate. Nevertheless the different MCS's produce different specific absorption rates due to the different transmission power levels and thus the use of a particular MCS in a give situation may not be compliant with the specific absorption rate limit.

As a consequence, although the technology exists to increase the rate of data transfer, there is a concern that transmitting at a higher RF power and data rate could violate the SAR limit.

BRIEF DESCRIPTION OF THE DRAWINGS

FIG. 3 graphically depicts a communication protocol used by the portable communication device;

FIG. 4 pictorially depicts a person using a portable communication device that has a single antenna;

FIG. 5 pictorially depicts a person using a portable communication device that has multiple antennas;

FIG. 8 is a flowchart of a first implementation of the transmission control technique for a portable communication device that has a single antenna;

FIG. 9 is a table of modulation and coding schemes used in the transmission control technique;

DETAILED DESCRIPTION OF THE DISCLOSURE

Figure 1:
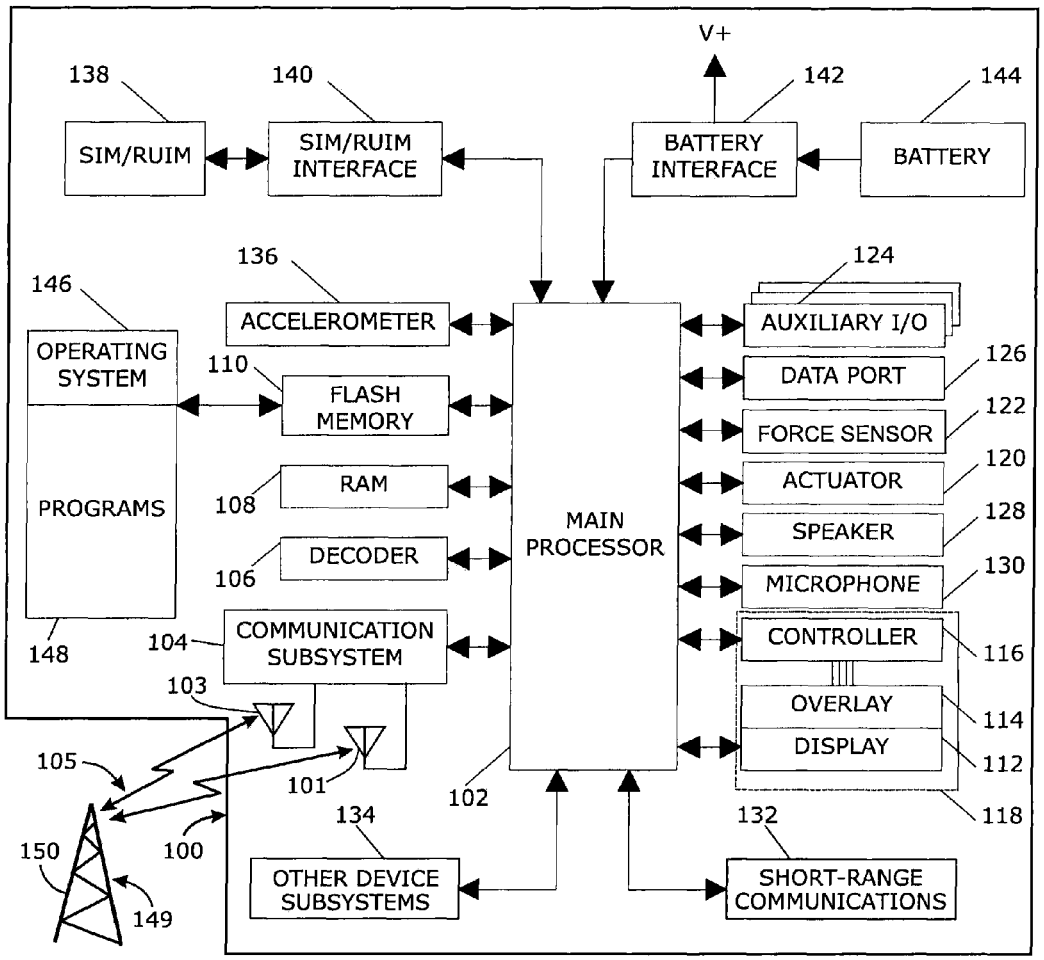
FIG. 1 is a block schematic diagram of the circuitry for an exemplary portable communication device that utilizes the present transmission control technique.

Transmission of data from a portable communication device to a base station via a radio frequency signal is controlled in a manner so that the signal does not result in a specific absorption rate limit being exceeded. Transmission uses a protocol that has recurring frames, each having a plurality of transmission slots, different numbers of which can be used to transmit the data. A power level for the radio frequency signal and the specific number of transmission slots in each frame are selected so that the data transmission complies with the specific absorption rate limit. Although various types of information, such as voice, data, images, video, and the like, can be transmitted from a portable communication device, for ease of understanding all such information shall, without limitation, be referred to herein generically as "data."

This signal control technique utilizes predefined relationships between the power level for the radio frequency signal and the specific number of transmission slots in a frame that may be used to transmit the data without the radio frequency signal resulting in a specific absorption rate limit being exceeded. For example, this relationship may be defined by a lookup table that, for each of a plurality of different power levels, designates a maximum number of transmission slots that may be used.

When the portable communication device desires to send a data transmission, an SAR compliance analysis is conducted. That analysis employs the power level, the number of transmission slots in each frame and the predefined SAR relationship determine whether the proposed data transmission will result in a specific absorption rate that is greater than the specific absorption rate limit.

When it is desirable to increase data throughput, a determination is made whether more transmission slots are available in each frame. If so, an SAR compliance analysis is conducted to determine if increasing the number of transmission slots, at the present power level and MCS, will produce a transmission that complies with the specific absorption rate limit. When compliance exists, the transmission proceeds, otherwise a determination is made whether the power level can be increased. In that case, the portable communication device switches to a higher ranked MCS. An SAR compliance analysis may be performed to ensure that a transmission at the higher power level and higher ranked MCS will not violate the specific absorption rate limit.

Examples of specific implementations of this signal control technique will be provided for portable communication devices that have single and multiple antennas. For simplicity and clarity of illustration, reference numerals may be repeated among the figures to indicate corresponding or analogous elements. Although very specific details are set forth in order to provide a thorough understanding of the embodiments described herein, the embodiments may be practiced without such specific features. In other instances, well-known methods, procedures and components have not been described in detail so as not to obscure the embodiments described herein. Also, the description is not to be considered as limited to the scope of the embodiments described herein.

The disclosure generally relates to a portable communication device, examples of which include mobile, or handheld, devices such as pagers, cellular phones, cellular smart-phones, wireless organizers, personal digital assistants, wirelessly enabled notebook computers, and the like.

With initial reference to FIG. 1, a portable communication device 100 includes a number of components such as a processor 102 that controls the overall operation of the portable communication device. Communication functions, including data and voice communications, are performed through a communication subsystem 104 that includes radio frequency transceiver connected to one or two antennas 101 and 103. The communication subsystem is able to select which one of the antennas to use and if the subsystem is capable of MIMO operation then both antennas may be used. In some communication device, the antennas 101 and 103 are conventional beam forming arrays that enable the radio frequency signal 105 to be directionally focused at an angle towards the intended receiver. Data received by the portable communication device 100 is decompressed and decrypted by a decoder 106. The communication subsystem 104 and antennas 101 and 103 receive messages from and send messages to a base station 150 via a radio frequency signal 105. The base station 150 may be part of a wireless network 149, such as, but not limited to, data-centric wireless networks, voice-centric wireless networks, and dual-mode networks that support both voice and data communications over the same physical stations. The portable communication device 100 is a battery-powered device and includes a battery interface 142 for receiving one or more rechargeable batteries 144.

The processor 102 also interacts with additional subsystems such as a random access memory (RAM) 108, a flash memory 110, a display 112 with a touch sensitive overlay 114 connected to an electronic controller 116 that together make up a touch sensitive display 118, an actuator 120, a force senor 122, an auxiliary input/output (I/O) subsystem 124, a data port 126, a speaker 128, a microphone 130, short-range communications subsystem 132 and other device subsystems 134. The processor 102 interacts with the touch-sensitive overlay 114 via the electronic controller 116. The processor 102 may also interact with an accelerometer 136. The accelerometer 43 may include a cantilever beam with a proof mass and suitable deflection sensing circuitry. The accelerometer 43 may be utilized for detecting direction of gravitational forces or gravity-induced reaction forces.

To identify a subscriber for network access, the portable communication device 100 uses a Subscriber Identity Module or a Removable User Identity Module (SIM/RUIM) card 138 inserted into a SIM/RUIM interface 140 for communication with the network 149 of which the base station 150 is a part. Alternatively, user identification information may be programmed into the flash memory 110.

The portable communication device 100 also includes an operating system 146 and software components 148 that are executed by the processor 102 and are typically stored in a persistent store such as the flash memory 110. Additional applications may be loaded onto the portable communication device 100 from the base station 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 149 through the communication subsystem 104. For voice communications, the overall operation of the portable communication device 100 is substantially similar except that the received signals are output to the speaker 128 and signals for transmission are generated by the microphone 130.

Figure 2:
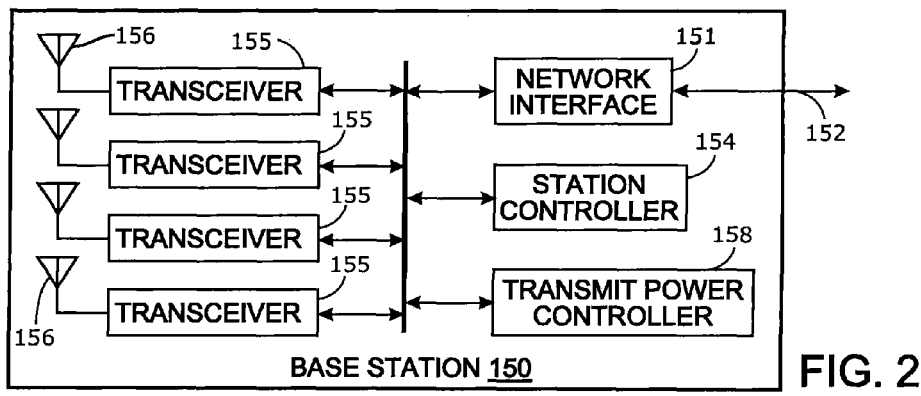
FIG. 2 is a block schematic diagram of circuitry for an exemplary base station with which the portable communication device communicates.

With reference to FIG. 2, the base station 150 includes a network interface 151 for connecting with a cellular telephone network 152, for example. A station controller 154 governs the overall operation of the base station as well as the establishment, maintenance, and release of radio frequency signal connections. The station controller 154 is connected to a plurality of transceivers 155, each having an antenna 156 for communicating with portable communication devices, such as device 100. Representative transceivers 155 are individually assigned to specific interactions with portable communication devices. At least one transceiver may be employed as a common control channel over which the base station transmits common signaling such as a pilot signal. The common channel is monitored by mobile devices within or near that base station's cell, and is also used to request a working channel (uplink) or to page a mobile device (downlink).

A transmit power controller 158 performs well known open loop and closed loop power management procedures to control the transmit power of the portable communication device transmissions received by the base station, e.g., so that the strength of the signals received by the base station 150 will be at a satisfactory level. As the portable communication device 100 travels away from the base station 150 the strength of its signal received by that base station decreases. If that signal strength decreases below an acceptable minimum threshold level, the base station 150 instructs the portable communication device to increase the power level of its transmissions. In other situations, as the portable communication device 100 travels toward the base station 150, the strength of the signal received at the station increases. When the signal strength exceeds a threshold level, the base station instructs the portable communication device to decrease the transmit power level to conserve battery power. A designation of the strength of the radio frequency signals received from each portable communication device with which the base station is communicating is stored in memory at the transmit power controller 158. Alternatively, a designation of the power level for each of those base stations may be determined by the transmit power controller 158 and stored in memory. The respective designation is communicated to the portable communication device as part of standard station keeping messages.

The radio frequency signal 105 that is employed to transmit data from the portable communication device 100 to the base station 150 utilizes a communication protocol, which as depicted in FIG. 3 has recurring, contiguous frames 160 each of which is divided into a plurality of transmission slots 162. In the exemplary communication protocol, each frame 160 is segmented into twenty transmission slots although other quantities of slots may be used. The portable communication device 100 can transmit data in one or more of the transmission slots 162 within each frame. The more data slots in each frame that are used, the faster the data are transmitted. The number of transmission slots 162 in each frame 160 that is used to transmit data are referred to as the "duty cycle" of the transmission. For example, using half of the transmission slots in each frame provides a 50% duty cycle, whereas employing all the slots results in a 100% duty cycle. However, using more data slots in a frame increases the specific absorption rate (SAR) produced by the radio frequency signal 105. Therefore, there may be a limit to the number of the slots within a given frame that can be used at a particular transmission power level without exceeding a specific absorption rate limit. As used herein the specific absorption rate limit may be a stated in regulations of a governmental agency or may be a SAR value that has been selected for use with the present technique.

As noted previously, it is desirable to control the portable communication device 100 so that its transmissions do not result in the specific absorption rate limit being exceeded. This limits the user's exposure to radio frequency (RF) energy. For that limiting function, the portable communication device 100 and the base station 150 utilize a transmission control technique that selects the transmit power level and the number of transmission slots in each frame to use for a data transmission that will be SAR compliant. The transmission control technique may be performed solely by the portable communication device 100, solely by the base station 150, or cooperatively by both.

In order to understand the present transmission control technique, it will be beneficial to understand how the location of the transmit antenna, the transmission power level and the number of transmission slots used affect compliance with the prescribed SAR limits.

Some portable communication devices have a single antenna, while other devices have two antennas to improve communication performance for increased data throughput and range without requiring additional bandwidth or transmit power.

Some portable communication devices have a single antenna, while other devices have two or more antennas to improve communication performance via an increased data throughput and range without requiring additional bandwidth or transmit power. Other devices may have beam forming antenna arrays, which an antenna array includes two or more antennas. Whether an excessively high specific absorption rate will occur also depends on the position of the antenna 103 in the portable communication device 100 with respect to the user's head. For example as shown in FIG. 4, an antenna 172 located at the bottom of the portable communication device 170 is positioned near the jaw of a user when transmitting. The specific absorption rate limit from this antenna orientation may be 0.9 W/kg, for example. In contrast, the portable communication device 180 in FIG. 5 is designed for multiple-input, multiple-output (MIMO) operation and thus has two antennas 182 and 184. The first antenna 182 is located adjacent the jaw of the user and thus has a specific absorption rate limit that is similar to that for the single antenna 172 in FIG. 4. However, the second antenna 184 is located adjacent an upper region of the user's head in which radio frequency energy is absorbed at a greater rate. Thus, transmissions from the second antenna 184 have a different specific absorption rate limit, such as 1.3 W/kg, for example.

The specific absorption rate limit restricts the number of transmission slots in each frame that may be used at the different available power levels. The number of transmission slots and the power level relationship to the specific absorption rate limit for an antenna is derived, during design of the portable communication device 100, by selecting a nominal power level (pn) and a nominal number of transmission slots (tn) to provide a nominal transmission configuration. Then a nominal specific absorption rate $SAR_n(f)$, that results from transmitting data at radio frequency f using the nominal transmission configuration, is derived. That derivation utilizes the technique specified in IEEE standard 1528-2003 promulgated by The Institute of Electrical and Electronics Engineers Inc., New York, N.Y., U.S.A.

The nominal power level $p_n$, the nominal number of transmission slots $t_n$, and the nominal specific absorption rate $SAR_n(f)$ are used to linearly extrapolate values for the other possible given power levels and given numbers of transmission slots at which the data may be transmitted by the portable communication device. That extrapolation uses the equation:

$$SAR_{ext}(f, p, t_r) = SAR_n(f) \frac{p \cdot t}{p_n \cdot t_n}$$

where $SAR_{ext}(f,p,t)$ is the extrapolated specific absorption rate value for a particular transmission configuration, f is the frequency of the radio frequency signal, while p is the given power level and t is the given number of transmission slots for the particular transmission configuration. For each given power level, the value of the given number of transmission slots is varied to find the maximum number at which the calculation yields an extrapolated SAR value that does not exceed the specific absorption rate limit.

Figure 6:
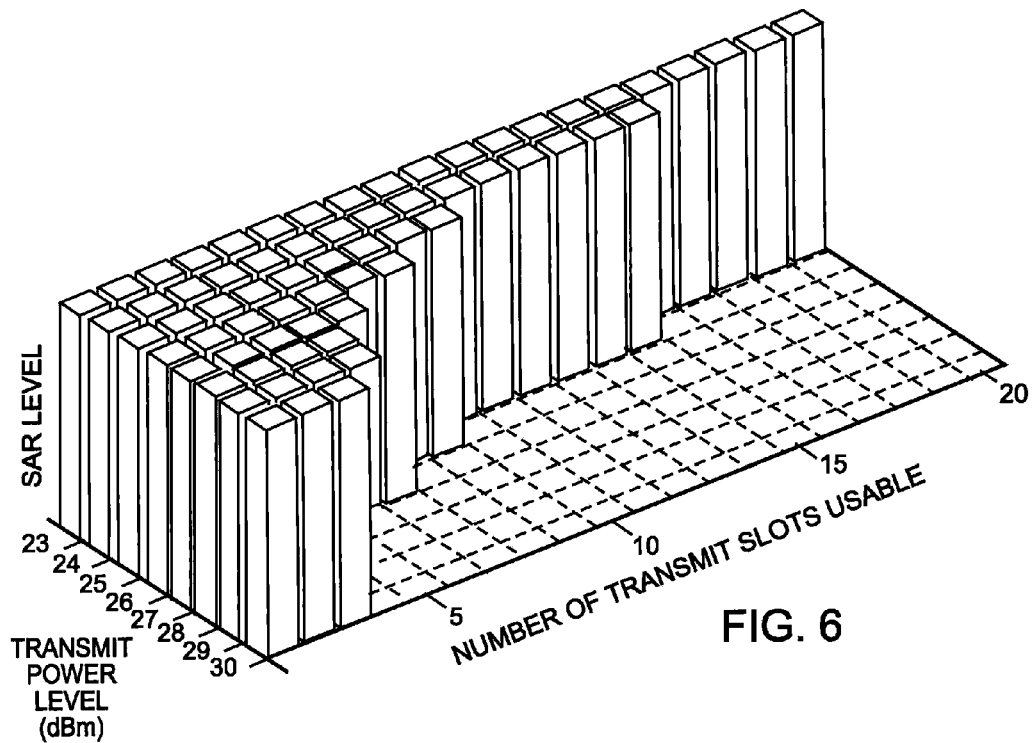
FIG. 6 is a graph illustrating a relationship between the transmit power level, the number of transmission slots used in a transmission frame, and the pass/fail state for the specific absorption rate for the portable communication device in FIG. 4.

This process for defining the relationship between variation of the power level for the radio frequency signal and the number of the transmission slots in a frame produces a set of data, an example of which is depicted graphically in FIG. 6 for the antenna 172 in FIG. 4. The vertical bars indicate a transmission configuration of a given power level and given number of transmission slots that is SAR compliant, i.e., at which the specific absorption rate resulting from the corresponding radio frequency signal does not exceed the specific absorption rate limit. As can be seen, the greater the transmit power level, the fewer number of slots that can be used for communication before the specific absorption rate limit is exceeded. For example, at a power level of 23 dBm all twenty transmission slots in the frame can be used to send data, whereas at 25 dBm only nine transmission slots can be used without exceeding the specific absorption rate limit. It can also be seen that a power increase might be allowed while the same number of transmission slots remains fixed.

For the dual antenna portable communication device 180 in FIG. 5, as similar SAR transmission parameter relationship is derived for the second antenna 184 is located adjacent an upper region of the user's head. Radio frequency energy emitted by this that second antenna 184 is absorbed at a greater rate than the lower first antenna 182. Thus, a different relationship between the RF power level and number of transmission slots exists for a specific absorption rate limit compliant transmission from the second antenna 184 as graphically depicted in FIG. 7. Note that for most of the different power levels, a lesser number transmission slots may be used without exceeding the specific absorption rate limit as compared to the first antenna 182 the relationship for which is depicted in FIG. 6.

The resultant transmission parameter SAR relationship for each antenna may be specified by a data lookup table in the memory of the station controller 154 (FIG. 2). Each data lookup table is indexed by the different power levels available for the portable communication device 100 to use. For each of those power levels, the data lookup table specifies the maximum number of transmission slots that can be used and still produce an SAR compliant transmission. The SAR data lookup table is employed to determine whether a proposed transmission from a portable communication device will comply with the predefined SAR limit, as will be described.

Figure 7:
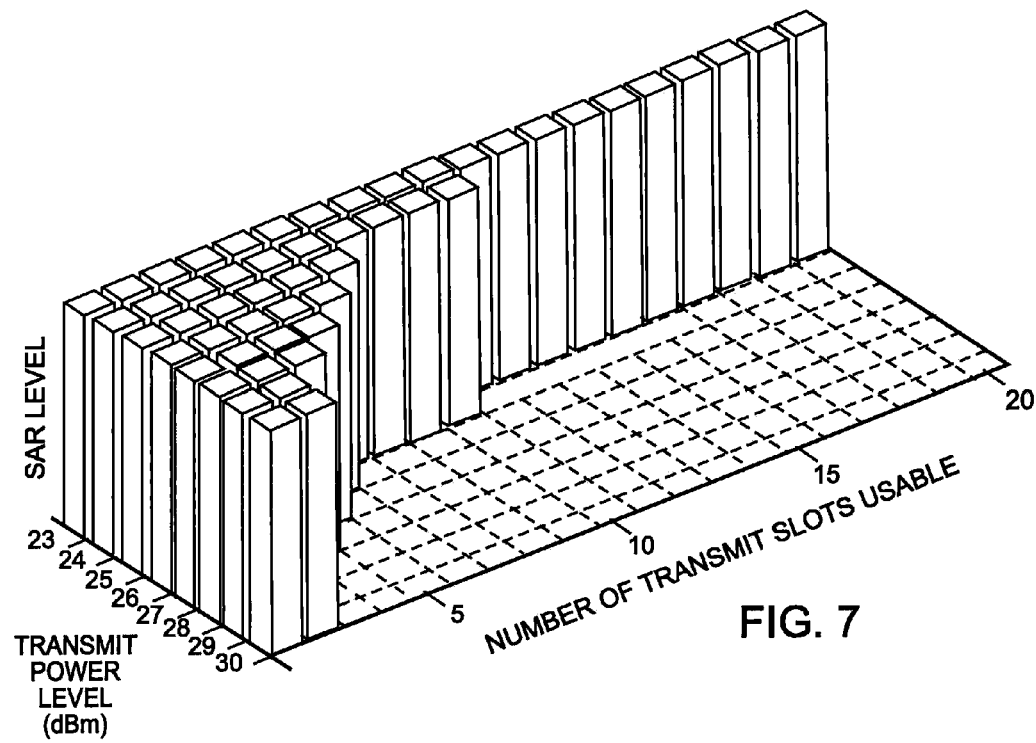
FIG. 7 is a graph illustrating a relationship between the transmit power level, the number of transmission slots used in a transmission frame, and the pass/fail state for the specific absorption rate when the antenna of a portable communication device is adjacent an ear of a user.

As can be seen from the graphical depictions in FIGS. 6 and 7, there is a limitation on the number of slots in each transmission frame that can be used to send data and still remain compliant with the SAR limit mandated by a regulatory agency. As a consequence, if it is desired that the portable communication device increase the data transmission rate, i.e., send more data per unit of time, it may be necessary to reduce the transmit power level in order to be able to utilize more transmission slots. However, reducing power may not be possible in many situations where that would not provide an adequate signal strength at the receiving end of the transmission. As a result, the present transmission control technique when faced with the situation of desiring a greater data throughput, but not being able to increase the number of transmission slots in each frame, upgrades to a higher ranked MCS.

It is counter intuitive that the present technique can increase the battery life of the portable communication device by switching to a higher ranked MCS and increasing the transmit power. Sending data at a higher coding rate may use fewer slots in each transmission frame and thus shorten the overall duration of the transmission.

With reference to FIG. 8, the first transmission control technique 200 can be utilized with a portable communication device that has a single antenna, such as device 170 shown in FIG. 4. This transmission control technique 200 commences whenever the is operating with a first modulation and coding scheme, a first power level and a first number of transmission slots and it is desired to increase the data throughput. The technique is executed by either the main processor 102 within the communication device (FIG. 1) or alternatively by the transmit power controller 158 in the base station 150 (FIG. 2). When the transmission control technique 200 is executed at a base station, the selection of particular MCS, power level, and number of transmission slots in each frame is communicated to the portable communication device for use in transmitting data. Therefore, although the present invention will be described in the context of performing the transmission control technique in the portable communication device, it should be understood that the process could be performed at the base station.

The first transmission control technique 200 commences at step 202 at which feedback information about a prior transmission is obtained by the portable communication device from the base station 150. This feedback information, which is conventionally transmitted to portable communication devices by communication networks, includes the transmission power control information (TPC), the modulation coding scheme (MCS), and the transport data block size (TBS). This standard transmission information enables the portable communication device to determine the parameters of a data transmission that are permitted with respect to the base station 150. The portable communication device also knows at this juncture, the amount of data to be transmitted and thus a desired level of data throughput.

At step 204, the transmission feedback information is used to set an MCS, a power level, and a number of transmission slots for communication base on a previous communication sent from the portable communication device. That is a transmission configuration is set to the first modulation and coding scheme, the first power level, and the first number of transmission slots. A determination then is made at step 206 whether the communication channel supports a higher data transmission rate. If it does not, the process branches to step 208 at which the power level and the number of transmission slots set previously at step 204 are used to transmit the data.

If at step 206, however, the communication channel allows a higher data rate, the process branches to step 210 at which a determination is made whether the number of transmission slots can be increased with the existing MCS. For example, the SAR data lookup table may indicate that the number of transmission slots used in the prior communication is less than the maximum allowable number. In this case, more slots can be utilized in each frame to send data and achieve a higher throughput. In another situation, the feedback information from the previous transmissions indicates that a lower power level can be utilized and still provide a satisfactory transmission to that base station. In this latter case, the SAR data lookup table may indicate that utilizing a lower power level will enable use of a greater number of transmission slots in each frame. Thus, when step 210 indicates that the number of transmission slots can be increased, the process branches to step 212. Now, the specification of the number of transmission slots to use is increased to the maximum number allowable and still be SAR compliant at the designated power level. The control process then advances to step 208 at which the data are transmitted.

Alternatively, if a determination is made at step 210 that the number of transmission slots can not be increased, the transmission control technique 200 advances to step 214. Now a determination is made whether the communication subsystem 104 in the portable communication device is capable of increasing the transmission power. If that is not possible, a transition occurs to step 208 at which the data are transmitted with the previous power level and number of transmission slots.

If the power level can be increased, the first transmission control technique 200 branches to step 216 at which the MCS is changed to a second one that provides a greater data rate. The selection of the MCS to use at this juncture is based on a table of modulation and coding schemes stored within the memory of either the portable communication device or the base station, whichever is performing this process. FIG. 9 depicts an exemplary table showing 16 different MCS modulation and coding schemes ranked in order of increasing maximum possible data throughput. In other words, the higher the MCS rank, the greater the data throughput. For each rank, a modulation type and a data coding rate are specified. At step 216, the MCS level is changed to a higher ranked one than was specified by the transmission feedback information. Changing to a higher ranked MCS may necessitate an increase in the transmission power in order to build a larger constellation for a given error rate. Nevertheless, the new modulation type and coding rate enables more data to be transmitted during each transmission slot. Thus fewer transmission slots need to be used to achieve the same data rate. In fact, although changing the MCS may require a higher power level and which in turn requires a reduction in the number of transmission slots per frame in order to comply with the SAR limit, greater the data throughput can be achieved due to the greater coding rate. The newly selected MCS becomes a second modulation and coding scheme to be used for transmitting the data.

At this time the RF signal's power level required for the selected MCS rank is derived. The transmission power required for each MCS rank is derived by the method described in the 3rd Generation Partnership Project (3GPP) Technical Specifications 36.213-870 and 36.101-900, available from the 3GPP Support Office, European Telecommunications Standards Institute, 650 Route des Lucioles, Sophia Antipolis, Valbonne, France and incorporated herein by reference. The requisite power level may be contained in the stored table of modulation and coding schemes. At step 218 the requisite power level for the second modulation and coding scheme is selected as a second power level to be used for transmitting the data.

The SAR data lookup table for the antenna then is employed at step 218 to determine the greatest number of transmission slots that can be utilized at the increased power level without the resultant transmission exceeding the SAR limit. This step selects a given number of transmission slots that is no greater that the first number of transmission slots used in the previous data transmission. This new set of transmission parameters are employed along with the new MCS to transmit the data at step 220.

As an alternative, upon a determination at step 214 that the power level may be increased, the first transmission control technique 200 branches to step 230 instead of step 216 as indicated by the dashed lines in FIG. 8. Now a higher second power level, than the existing first power level set at step 204, is selected based on a predefined criteria. As examples, the predefined criteria may be the next higher discrete power level or the highest power level available to the portable communication device. Then at step 232, the highest ranked MCS that can be used at this higher power level is selected as a second power level. This step uses a requisite power level associated with each MCS in the table of MCS rankings (e.g. FIG. 9). Those power levels are derived as described previously. Next at step 234, the selected second power level is applied to the relationship between the power level for the radio frequency signal and the specific number of transmission slots in a frame to determine the maximum number of transmission slots that may be used to transmit data at the selected MCS without the radio frequency signal resulting the SAR limit being exceeded. This latter step selects a given number of transmission slots. Thereafter, the data is transmitted at step 236 using the second modulation and coding scheme, the second power level, and the given number of transmission slots per frame.

In summary, the present transmission control technique analyzes whether the maximum number of transmission slots at the previous power level provides the desired level of data throughput. If not and if the transmission power level can be increased, the control technique selects a higher ranked modulation and coding scheme to achieve the greatest data throughput while still complying with the SAR limits.

Figure 10:
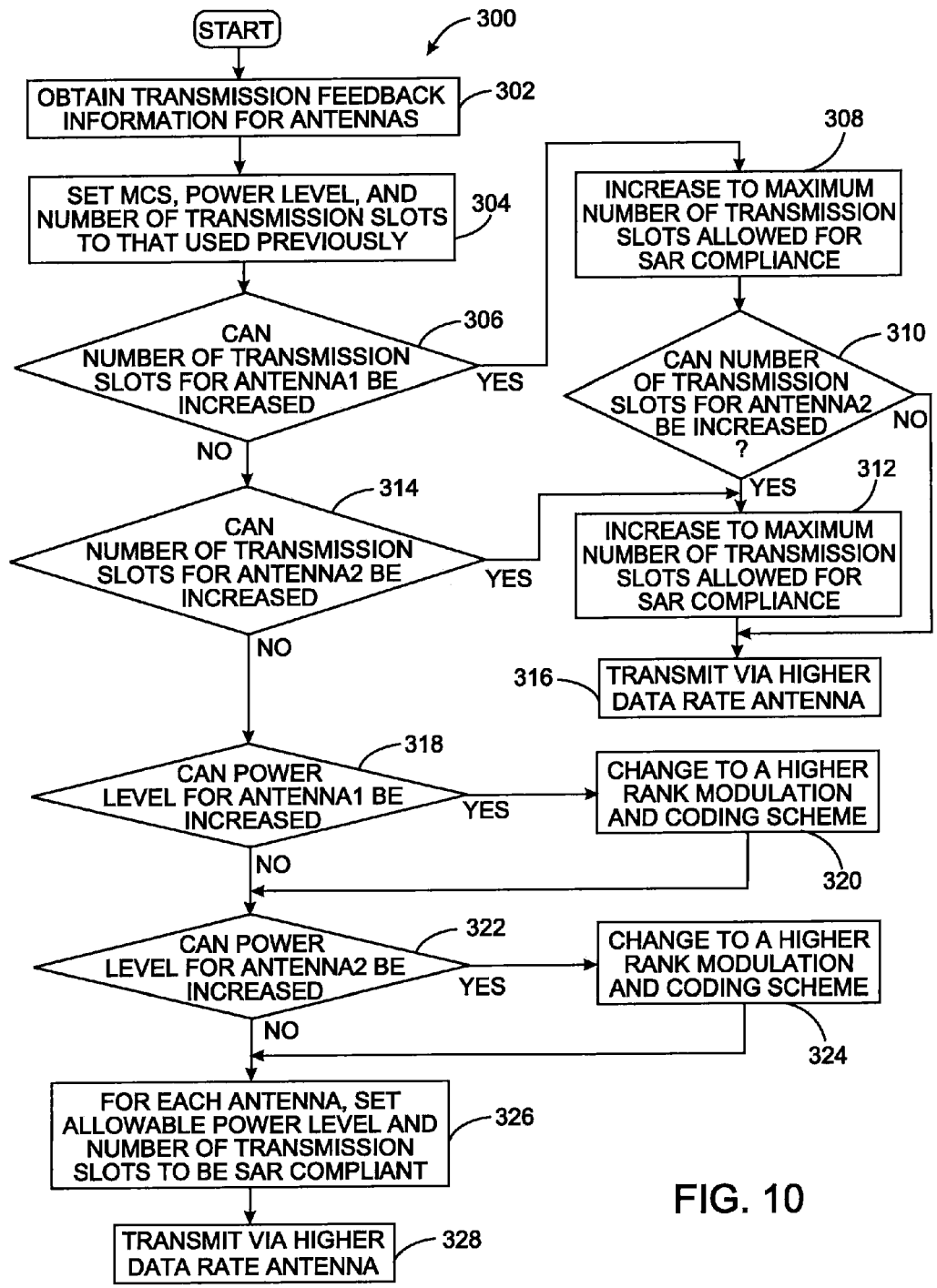
FIG. 10 is a flowchart of a second implementation of the transmission control technique for a portable communication device that has a two antennas.

A similar transmission control technique 300 shown in FIG. 10 can be utilized with the portable communication device in FIG. 5 that has two antennas 182 and 184. This second transmission control technique 300 commences at step 302 in FIG. 10 by obtaining the transmission feedback information derived from previous transmissions. Next at step 304, the SAR data in the lookup tables for each antenna are used to define a separate power level and number of transmission slots that was used for previous communications by each antenna. A determination is made at step 306 whether the number of transmission slots for the first antenna 182 can be increased. If so, the process branches to step 308 where the number of transmission slots is set to the maximum number allowed while still being compliant with the SAR limit. That maximum number of transmission slots is derived using the SAR data lookup table, mentioned previously. Then the process advances to step 310 where a determination is made whether the number of transmission slots for the second antenna 184 also can be increased in which case the number of transmission slots for that antenna is set to the maximum allowed for SAR compliance at step 312. Otherwise, if the number of transmission slots for the second antenna cannot be increased, the process jumps directly from step 310 to step 316. At step 316, the data are then transmitted using the antenna that provides the higher data rate.

Returning to step 306, if a determination was made that the number of transmission slots for the first antenna cannot be increased, the transmission control technique 300 branches to step 314 where a determination is made whether the number of transmission slots for the second antenna 184 can be increased. If so, that number is increased at step 312 to the maximum number without exceeding the SAR limit. Then at step 316, the data are transmitted using whichever one of the first and second antennas provides the higher data transmission rate.

If the number of transmission slots that can be utilized cannot be increased for either the first or second antenna, the transmission control technique 300 reaches step 318. At this point, a determination is made whether the power level for the first antenna 184 can be increased. If that may occur, the process branches to step 320 where the modulation and coding scheme for the first antenna is increased to a higher ranked one. That operation utilizes a modulation and coding scheme table similar to that in FIG. 9. Based on that table, the MCS designated for the first antenna is changed to a higher ranked scheme by selecting a higher level entry in the table. The control process then moves ahead to step 322, to which the process also would have reached, if at step 318 a determination was made that the power level for the first antenna could not be increased. At step 322 a determination is made whether the power level for the second antenna 184 can be increased. If that is possible, the MCS for the second antenna is changed to a higher ranked at step 324 utilizing the corresponding MCS table stored in the apparatus that is executing the second transmission control technique 300.

Regardless of whether the power level for the second antenna can be increased as determined at 322, the process eventually advances to step 326. At this point, the allowable power level and number of transmission slots that will produce a transmission that does not exceed the SAR limit are derived for both antennas. Thereafter, at step 328, the data are transmitted via whichever one of the first and second antennas provides the higher data transmission rate.

Thus the present transmission control technique selects the highest allowable modulation and coding scheme to optimize the data throughput and thereby provide the user with a better communication experience.

Figure 11:
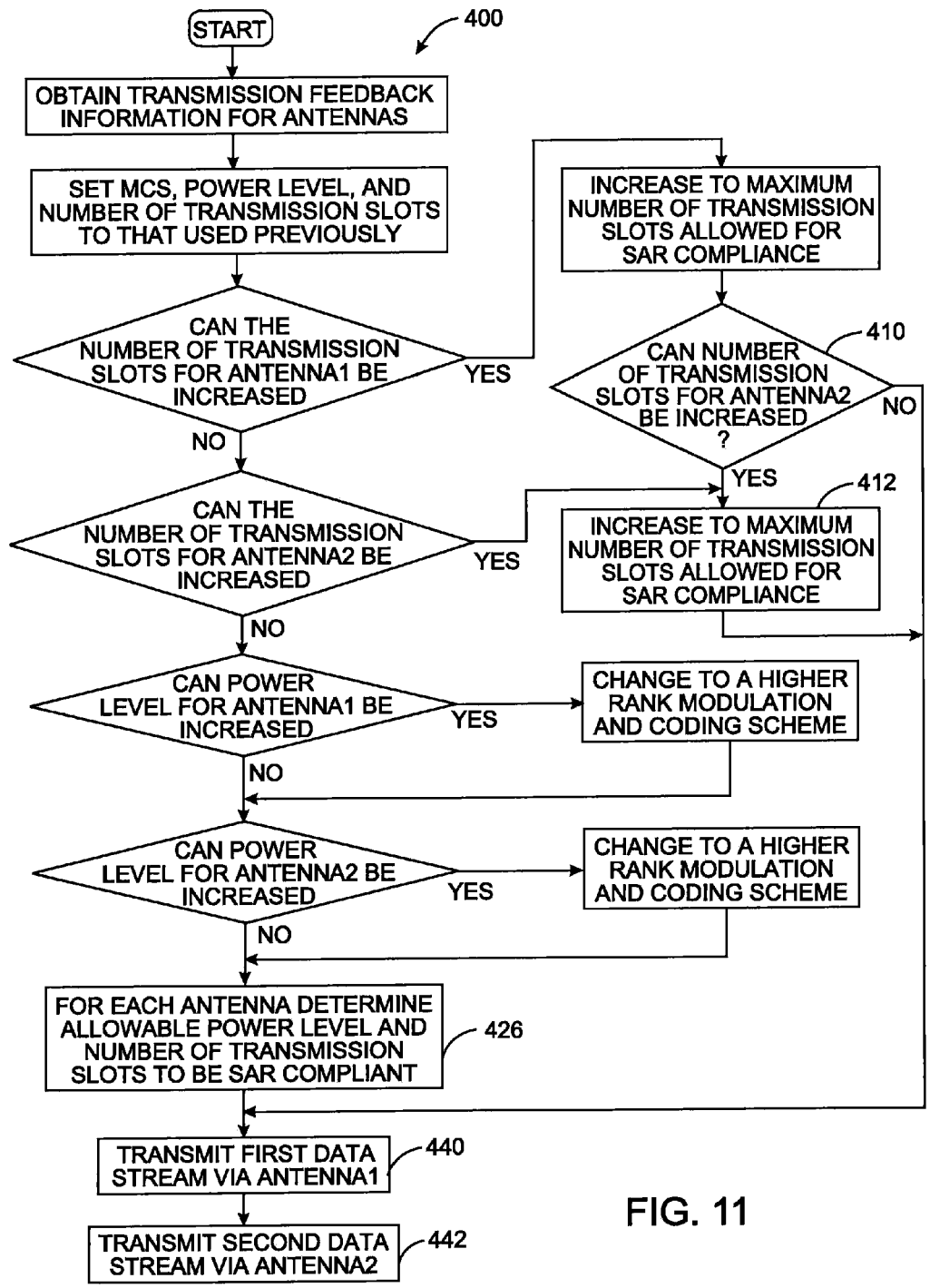
FIG. 11 is a flowchart of a third implementation of the transmission control technique for a portable communication device capable of multiple input, multiple output (MIMO) operation.

A third transmission control technique 400 can be employed with portable communication devices that employ multiple input, multiple output (MIMO) transmissions in which both antennas 182 and 184 of the device 180 in FIG. 5 are employed to transmit data simultaneously. For this type of portable communication device, a modulation and coding scheme is independently selected for each antenna to optimize its data throughput. For such MIMO systems, the third transmission control technique 400 shown in FIG. 11 is similar to that shown and described with respect to FIG. 10. One difference is that there is not an equivalent step to step 316. Instead, upon execution of either or both of steps 410 and 412, the process jumps to step 440 at which the first data stream is transmitted via the first antenna 182 using its previously defined power level and number of transmission slots. Simultaneously, a second data stream is transmitted via the second antenna 184 at step 442 utilizing that antenna's separately defined power level and number of transmission slots. Another distinction is that when a higher ranked modulation and coding scheme is selected for either of the antennas, the SAR compliant power level and number of transmission slots are defined for both antennas at step 426. Thereafter, both antennas are used at steps 440 and 442 to transmit the first and second data streams, respectively. Those transmissions utilize the newly defined modulation and coding schemes.

Other types of portable communication devices have antennas that are conventional beam forming arrays which enable the wireless signal to be directionally focused at an angle towards the intended receiver. Here, each antenna 101 and 103 in FIG. 1 is an array comprising a main element and a parasitic element. The direction where the maximum gain of the emitted wireless signal appears is controlled by adjusting the phase difference between signals applied to the different elements of the antenna. The communication subsystem 104 by controls the phase of those signals The main processor 102 in the portable communication device 100 utilizes a conventional procedure to sense when switching to a beam forming mode of operation is necessary. In that situation, each of the two antenna arrays 101 and 103 may have a different SAR limit and hence a different allowable power level and MCS in ranked that its transmission does not exceed the respective SAR limit. The main processor 102 also senses whether the portable communication device is sending data, voice, an image, or another type of information and intelligently switches between the two beam forming antenna arrays based on the better communication link margin performance with the highest possible MCS.

Figure 12:
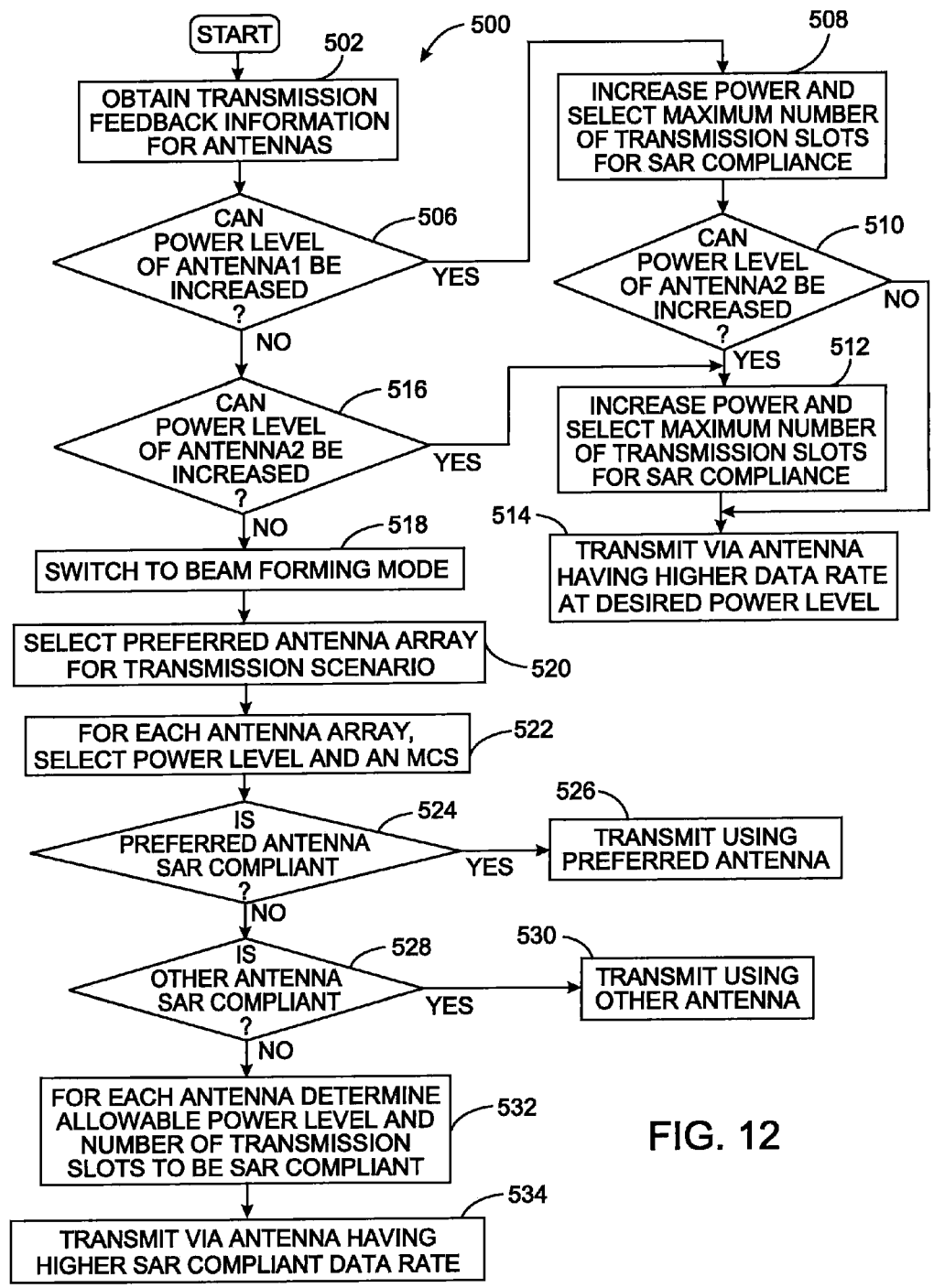
FIG. 12 is a flowchart of a second implementation of the transmission control technique for a portable communication device that has two beam forming antennas.

FIG. 12 represents a flow chart of this process by which the transmission from the portable communication device is dynamically and adaptively configured. As noted with previous embodiments of the present transmission control technique, the steps of this procedure may be performed either in the portable communication device or by the base station in which case the results of the process are sent to the portable communication device for configuring its transmission.

The fourth transmission control technique 500 used with beam forming type portable communication devices is executed whenever it is necessary to increase the uplink margin. At that time, the control process commences at step 502 in a non-beam forming mode. Here, the feedback information related to previous transmissions is obtained in a manner described previously. Then at step 506, a determination is made whether the power level for transmissions from the first antenna can be increased. If so, a transition occurs to step 508 at which the power is increased and the SAR data lookup table is used to select the maximum number of transmission slots allowable at that power level without the transmission exceeding the SAR limit. Thereafter, a determination is made at step 510 whether the power level for the second antenna can be increased. If that is possible, its power level is increased and the maximum number of transmission slots are selected at step 512 in ranked for the resultant transmission to be SAR compliant. Then at step 514, the information is transmitted using whichever one of the first and second antenna, provides a higher data rate at the desired power level.

If at step 506 the power level of the first antenna cannot be increased, the process branches to step 516 where a determination is made whether the power level of the second antenna can be increased. If so, the process branches to step 512 at which the power is increased and the maximum number of transmission slots is selected at that power level in ranked for the resultant transmission will not exceed the SAR limit. Then at step 514, the information is transmitted using the second antenna as that one enables transmission at the desired power level.

Upon executing step 516, if the power level to neither the first nor second antenna can be increased, the fourth transmission control technique 500 advances to step 518 at which the operation is switched to a beam forming mode.

Depending upon the transmission scenario, i.e., whether data, voice, image or other information is being sent, and the position of each antenna is used at step 520 to select one of the two antennas as the preferred one in this situation. For example, the first antenna 182 at the bottom of the device is preferred for voice transmissions, while the second antenna 184 at the top of the portable communication device 180 in FIG. 5 is preferred for data transmissions. Thereafter at step 522, a power level is selected for each of those antennas.

A determination is then made at step 524 whether a modulation and coding scheme is available at the selected power level that will provide a transmission which is SAR compliant. If so, the process branches to step 526 at which the preferred antenna is employed to transmit the information.

If, however, the preferred antenna cannot be operated in an SAR compliant manner, the fourth transmission control technique 500 makes a transition to step 528 at which a determination is made whether the other antenna can transmit the information in a manner that complies with the SAR limit. Specifically, the SAR data lookup table for this other antenna is used to determine whether a transmission can occur at the selected power level and an available MCS without exceeding the prescribed SAR limit. If that operation can occur, the data are transmitted using the other antenna at step 530.

If the determination at step 528, indicates that neither antenna can be operated at the requisite power level in an SAR compliant manner, the control process advances to step 532. At this juncture, a determination is made for each antenna using the respective SAR data lookup table data the highest power level and number of transmission slots in each frame that can be used to provide an SAR compliant transmission.

Then at step 534, the data are transmitted at whichever one of the first and second antennas can be operated at the higher SAR compliant data rate.

The foregoing description was primarily directed to a preferred embodiment of the disclosure. Although some attention was given to various alternatives within the scope of the disclosure, it is anticipated that one skilled in the art will likely realize additional alternatives that are now apparent from of the embodiments described herein. Accordingly, the scope of the protection provided hereby should be determined from the following claims and not limited by the above disclosure.

The invention claimed is:

1. A method for transmitting data from a portable communication device to a base station via a radio frequency signal, wherein the data are transmitted using a plurality of modulation and coding schemes and using a protocol that has recurring frames, each frame having a plurality of transmission slots, different numbers of which can be used to transmit the data, the method comprising:
   pre-defining a relationship between possible power levels for the radio frequency signal and a maximum number of the transmission slots in a frame for each of a first antenna and a second antenna that may be used by the portable communication device to transmit the data without the radio frequency signal resulting in a specific absorption rate (SAR) limit being exceeded, the first antenna and the second antenna each having a different SAR limit;
   when desiring to transmit data, selecting a first power level for the radio frequency signal for the first antenna;
   in response to selecting the first power level, selecting one of the plurality of modulation and coding schemes as a first selected scheme associated with the first power level;
   using the first power level and the relationship for the first antenna to select first maximum number of transmission slots;
   selecting a second power level for the radio frequency signal for the second antenna;
   in response to selecting the second power level, selecting one of the plurality of modulation and coding schemes as a second selected scheme associated with the second power level;
   using the second power level and the relationship for the second antenna to select a second maximum number of transmission slots;
   setting the first power level, the first selected scheme, and the first maximum number of transmission slots as first antenna parameters;
   setting the second power level, the second selected scheme, and the second maximum number of transmission slots as second antenna parameters;
   determining a transmission scheme based on the first antenna parameters and the second antenna parameters; and
   transmitting the data according to the transmission scheme.

2. The method as recited in claim 1 wherein each of the plurality of modulation and coding schemes enables data to be transmitted at a different data rate, and selecting one of the plurality of modulation and coding schemes chooses one that enables the data to be sent at the highest data rate without exceeding the specific absorption rate limit.

3. The method as recited in claim 2 further comprising the base station determining whether the given number of transmission slots is available for use by the portable communication device, and if not, the base station changes the number of transmission slots that the portable communication device may use to transmit the data.

4. The method as recited in claim 1 further comprising selecting a given one of the plurality of antennas that enables transmission at the greatest data rate; and wherein transmitting the data employs the given one of the plurality of antennas.

5. The method as recited in claim 1 wherein transmitting the data employs each of the plurality of antennas.

6. A portable communication device used to transmit data to a base station via a radio frequency signal, wherein the data are transmitted using a plurality of modulation and coding schemes and using a protocol that has recurring frames, each frame having a plurality of transmission slots, different numbers of which can be used to transmit the data, the portable communication device comprising:
   a first antenna;
   a second antenna; and
   a processor configured to:
      pre-define a relationship between possible power levels for the radio frequency signal and a maximum number of the transmission slots in a frame for each of a first antenna and a second antenna that may be used by the portable communication device to transmit the data without the radio frequency signal resulting in a specific absorption rate (SAR) limit being exceeded, the first antenna and the second antenna each having a different SAR limit,
      when desiring to transmit data, select a first power level for the radio frequency signal for the first antenna;
      select one of the plurality of modulation and coding schemes as a first selected scheme associated with the first power level;
      select a first maximum number of transmission slots using the first power level and the relationship for the first antenna;
   select a second power level for the radio frequency signal for the second antenna;
      select one of the plurality of modulation and coding schemes as a second selected scheme associated with the second power level;
      select a second maximum number of transmission slots using the second power level and the relationship for the second antenna;
      set the first power level, the first selected scheme, and the first maximum number of transmission slots as first antenna parameters;
      set the second power level, the second selected scheme, and the second maximum number of transmission slots as second antenna parameters;
      determine a transmission scheme based on the first antenna parameters and the second antenna parameters; and
      transmit the data according to the transmission scheme.

7. The portable communication device as recited in claim 6 wherein each of the plurality of modulation and coding schemes enables data to be transmitted at a different data rate, and selecting one of the plurality of modulation and coding schemes chooses one that enables the data to be sent at the highest data rate without exceeding the specific absorption rate limit.

8. The portable communication device as recited in claim 7 further comprising the base station determining whether the given number of transmission slots is available for use by the portable communication device, and if not, the base station changes the number of transmission slots that the portable communication device may use to transmit the data.

9. The portable communication device as recited in claim 6 further comprising selecting a given one of the plurality of antennas that enables transmission at the greatest data rate; and wherein transmitting the data employs the given one of the plurality of antennas.

10. The portable communication device as recited in claim 6 wherein transmitting the data employs each of the plurality of antennas.

* * * * *